United States Patent
Addala et al.

(10) Patent No.: US 9,635,036 B2
(45) Date of Patent: *Apr. 25, 2017

(54) MANAGING USER AUTHENTICATION IN ASSOCIATION WITH APPLICATION ACCESS

(71) Applicant: International Business Machines Corporation, Armonk, NY (US)

(72) Inventors: Prasanth N. S. Addala, Bangalore (IN); Pranab Agarwal, Southport (AU)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/268,659

(22) Filed: Sep. 19, 2016

(65) Prior Publication Data

US 2017/0006011 A1 Jan. 5, 2017

Related U.S. Application Data

(63) Continuation of application No. 15/251,079, filed on Aug. 30, 2016, which is a continuation of application No. 14/790,176, filed on Jul. 2, 2015.

(51) Int. Cl.
*H04L 29/06* (2006.01)
*G06F 21/31* (2013.01)
*H04L 9/32* (2006.01)

(52) U.S. Cl.
CPC .......... *H04L 63/105* (2013.01); *G06F 21/316* (2013.01); *H04L 9/3226* (2013.01); *H04L 63/083* (2013.01); *H04L 63/102* (2013.01)

(58) Field of Classification Search
CPC ... H04L 63/083; H04L 63/105; H04L 9/3226; G06F 21/316
See application file for complete search history.

(56) References Cited

U.S. PATENT DOCUMENTS 7,337,219 B1 2/2008 Meenan et al.
7,594,003 B2 9/2009 Davidson et al.
(Continued)

FOREIGN PATENT DOCUMENTS

GB 2416651 A 2/2006

OTHER PUBLICATIONS

Anonymous, "Business continuity through temporary authentication during corporate LDAP failure; provided no Stand by LDAP server available," An IP.com Prior Art Database Technical Disclosure, IP.com No. 000239725, IP.com Electronic Publication: Nov. 27, 2014, 5 pgs.

(Continued)

*Primary Examiner* — Victor Lesniewski
(74) *Attorney, Agent, or Firm* — Nicholas D. Bowman

(57) ABSTRACT

A determination is made that an authentication mechanism is unable to complete an attempt to authenticate, in association with a user attempting to access an application, user credentials. The user credentials include a user identifier and an additional authentication factor. An access allowance rate for the authentication mechanism is identified. The access allowance rate is based on a plurality of prior completed authentication attempts associated with the user identifier. A determination is made that the access allowance rate satisfies a set of criteria. In response to the determination that the authentication mechanism is unable to complete the authentication attempt and further in response to the determination that the access allowance rate satisfies the set of criteria, the user is allowed access to the application.

1 Claim, 6 Drawing Sheets

(56) References Cited

U.S. PATENT DOCUMENTS

| | | |
|---|---|---|
| 7,707,630 B2 | 4/2010 | Childs et al. |
| 8,132,017 B1 | 3/2012 | Lewis |
| 8,239,674 B2 | 8/2012 | Lee et al. |
| 8,689,294 B1 | 4/2014 | Thakur et al. |
| 8,914,856 B1 | 12/2014 | Velummylum et al. |
| 8,925,058 B1 | 12/2014 | Dotan et al. |
| 8,955,086 B2 | 2/2015 | Pal |
| 9,300,649 B2 | 3/2016 | Dickinson et al. |
| 9,438,604 B1 | 9/2016 | Addala et al. |
| 2003/0093690 A1 | 5/2003 | Kemper |
| 2003/0191594 A1 | 10/2003 | Kondo et al. |
| 2003/0208684 A1 | 11/2003 | Camacho et al. |
| 2006/0015725 A1 | 1/2006 | Voice et al. |
| 2007/0220590 A1 | 9/2007 | Rasmussen et al. |
| 2007/0234063 A1 | 10/2007 | Ueda et al. |
| 2008/0034209 A1 | 2/2008 | Dickinson et al. |
| 2008/0120699 A1 | 5/2008 | Spear |
| 2008/0313186 A1 | 12/2008 | Marsh |
| 2009/0037979 A1 | 2/2009 | Dellaratta, Jr. et al. |
| 2009/0125526 A1 | 5/2009 | Neufeld |
| 2009/0199264 A1 | 8/2009 | Lang |
| 2009/0217058 A1 | 8/2009 | Obereiner et al. |
| 2010/0148922 A1 | 6/2010 | Yamada et al. |
| 2010/0169952 A1 | 7/2010 | Maki et al. |
| 2010/0186084 A1 | 7/2010 | Hamid |
| 2011/0106795 A1 | 5/2011 | Maim |
| 2012/0060214 A1 | 3/2012 | Nahari |
| 2012/0317630 A1 | 12/2012 | Goldberg |
| 2013/0042327 A1 | 2/2013 | Chow |
| 2013/0047210 A1 | 2/2013 | Rotman |
| 2013/0340052 A1 | 12/2013 | Jakobsson |
| 2014/0282868 A1 | 9/2014 | Sheller et al. |
| 2014/0373104 A1 | 12/2014 | Gaddam et al. |
| 2015/0007284 A1 | 1/2015 | Meehan et al. |
| 2015/0019858 A1 | 1/2015 | Roth et al. |
| 2015/0143498 A1 | 5/2015 | Pal |
| 2015/0358328 A1 | 12/2015 | Kaplan et al. |
| 2016/0087957 A1 | 3/2016 | Shah et al. |

OTHER PUBLICATIONS

Jagadeesan, H., "Design and Verification of Privacy and User Re-authentication Systems," M.S. Thesis submitted to the faculty of Virginia Polytechnic Institute and State University, Bradley Department of Electrical and Computer Engineering, Blacksburg, Virginia, Apr. 30, 2009, 116 pgs., © Harini Jagadeesan.

Unknown, "Device/Browser Fingerprinting—Heuristic-Base Authentication," http://docs/secureauth.com/pages/viewpage.action?pageId=15860199 (last modified Sep. 25, 2014; last accessed Apr. 29, 2015 11:58 AM), 10 pgs.

Unknown, "How to use LDAP credentials offline?" http://stackoverflow.com/questions/581247/how-to-use-ldap-credentials-offline (last accessed Apr. 29, 2015 11:56 AM), 4 pgs.

Unknown, "SecureAuth IdP 7.0 Heuristic-Based Authentication," SecureAuth Assert Your Identity, May 2013, SecureAuth Corporation®, https://download.gosecureauth.com/tech/docs/SecureAuth%20IdP%20-%20Heuristics.pdf, 3 pgs.

Kimura et al., "Disruption-Tolerant Sessions for Seamless Mobility", 2012 IEEE Wireless Communications and Networking Conference: Mobile and Wireless Networks, Apr. 1-4, 2012, pp. 2412-2417.

Chen et al., "Secondary User Authentication based on Mobile Devices Location", 2010 Fifth IEEE International Conference on Networking, Architecture, and Storage, Jul. 15-17, 2010, pp. 277-281.

Addala et al., "Managing User Authentication in Association With Application Access", U.S. Appl. No. 14/790,176, filed Jul. 2, 2015.

Addala et al., "Managing User Authentication in Association With Application Access", U.S. Appl. No. 15/251,079, filed Aug. 30, 2016.

IBM, List of IBM Patents or Patent Applications Treated as Related, Nov. 28, 2016, 2 pages.

U.S. Appl. No. 15/251,079, Accelerated Examination Support Document, Dated Aug. 29, 2016, 25 pages.

MANAGING USER AUTHENTICATION IN ASSOCIATION WITH APPLICATION ACCESS

BACKGROUND

The present disclosure relates to data processing and, more specifically, to managing user authentication in association with application access.

In situations where a user desires to access an application (e.g., a corporate application hosted on a corporate artifacts server), the user may first be required to verify his identity before he is allowed to use the application's data. This may involve the user providing user credentials that are then authenticated by one or more authentication mechanisms. Once authenticated, the user is provided access to the application.

In some situations, the user's credentials may be authenticated on a computer that is separate from the computer that hosts the application to which he desires access. For example, an organization may use the Lightweight Directory Access Protocol (LDAP) to provide single sign on for different applications offered by the organization. Where LDAP is utilized, a user may login to an authenticated session by providing his user credentials to an authentication mechanism on an LDAP server. Once the user is in an authenticated session, he may be able to utilize multiple applications (e.g., multiple web services) that all acknowledge the authority of the LDAP server to grant access rights.

SUMMARY

According to embodiments of the present disclosure, aspects of the disclosure may include a method, a system, and a computer program product. In some embodiments, a determination is made that an authentication mechanism is unable to complete an attempt to authenticate, in association with a user attempting to access an application, user credentials. The user credentials include a user identifier and an additional authentication factor. An access allowance rate for the authentication mechanism is identified. The access allowance rate is based on a plurality of prior completed authentication attempts associated with the user identifier. A determination is made that the access allowance rate satisfies a set of criteria. In response to the determination that the authentication mechanism is unable to complete the authentication attempt and further in response to the determination that the access allowance rate satisfies the set of criteria, the user is allowed access to the application.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of some embodiments and do not limit the disclosure.

Figure 1:
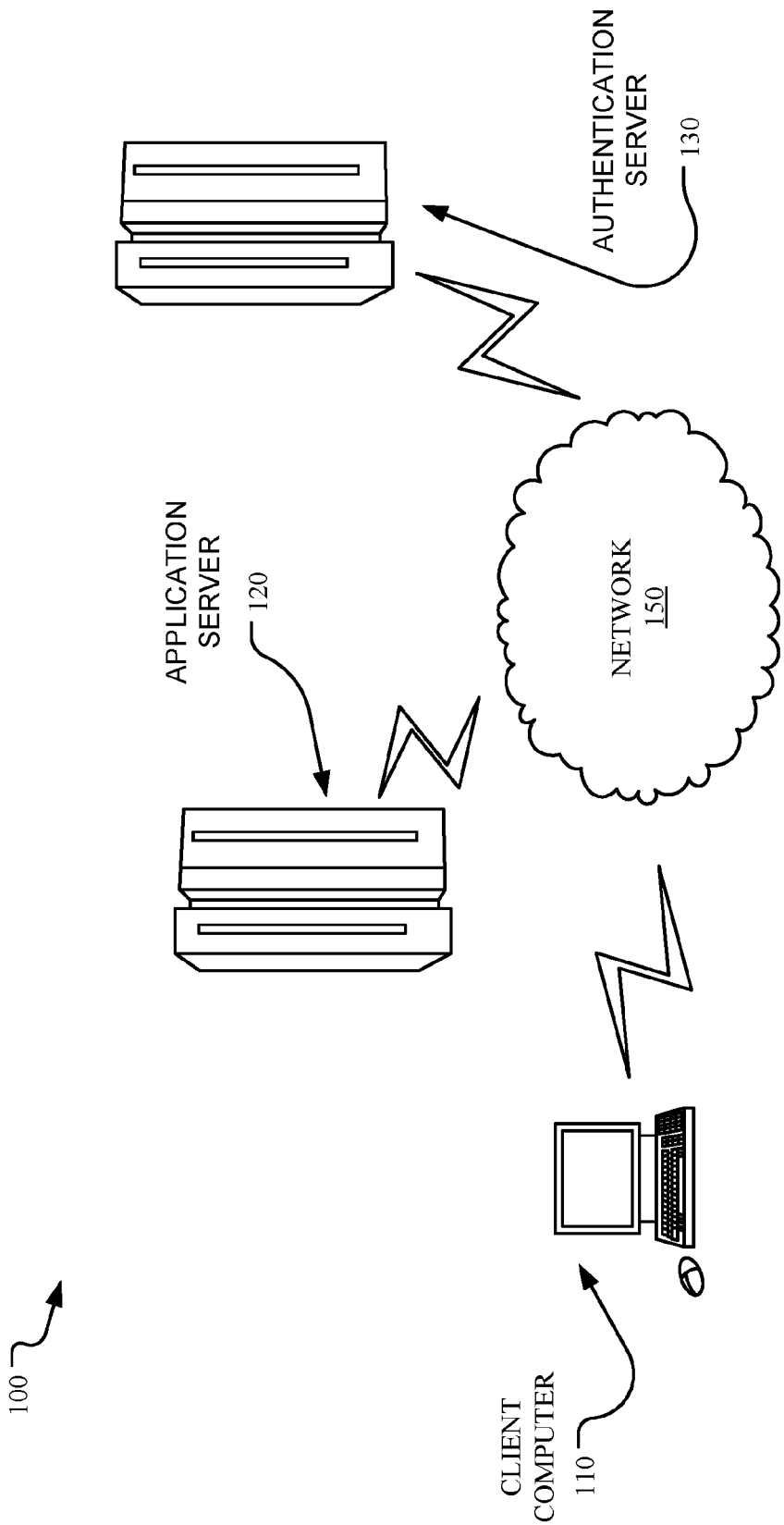
FIG. 1 illustrates a diagram of an example computing environment used in application access management, in accordance with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to data processing and, more specifically, to managing user authentication in association with application access. While the present disclosure is not necessarily limited to such applications, various aspects of the disclosure may be appreciated through a discussion of various examples using this context.

In some situations, having a central authentication server used for single sign on in a multi-application environment can create difficulties. Some of these difficulties may stem from the dependency of the applications on the authentication server for user authentication. This reliance on the authentication server can mean that applications face great challenges in authentication if, for some reason, the authentication server is offline or does not respond to authentication calls made by the applications. For example, if a user logs in to a dependent application and then the application is not able to communicate with the authentication server, the application may not have any way of determining whether the user should be granted access.

Unfortunately, there are a variety of situations in which an authentication server may not be able to complete an attempt to authenticate a user for an application. For example, there could be a hardware or software failure on the authentication server. For another example, there could be a network failure between an authentication server and the computer hosting the application or the computer hosting the user to be authenticated (which may be the same computer). For yet another example, a user may be logging in to an application from a physical location that is remote from (e.g., outside of) an intranet on which the authentication server operates (e.g., outside of corporate network).

In some embodiments of the present disclosure, an application (or the computer on which it is hosted) may include mechanisms that allow it to verify a user's identity, and thereby allow the user to access the application, even in situations where an authentication server is unavailable. In some embodiments, application-based authentication may rely, at least partially, on one or more heuristics. Underlying these heuristics, in some embodiments, may be an assumption that a current login attempt based on a user identifier that has been previously logged in with a high rate of success is more likely to be a current login attempt by a legitimate user. The opposite may also be true: user identifiers associated with many failed authentications in the past may be less likely to be associated with a successful login now.

In some embodiments, a first authentication heuristic may involve prior completed authentication attempts from times when the authentication server was available. Specifically, each time an attempt to authenticate user credentials is completed by the authentication server, notification of the result of the completed attempt may be provided to an application server. The notification may include an indication that a user with a particular user identifier either (i) entered the correct credentials and was, therefore, successfully authenticated or (ii) entered the incorrect credentials and was, therefore, not authenticated.

In some embodiments, the application server compiles these notifications from the authentication server into allowance rate statistics of one or more users. Then, in situations where the authentication server is unavailable, the application may use these allowance rate statistics in determining whether to allow a particular user access to application data. More specifically, the application may determine whether the allowance rate for that particular user satisfies a set of criteria (e.g., if the allowance rate is high enough). If the allowance rate does not satisfy the set of criteria, then the user may be denied access. If the allowance rate is satisfactory, however, the user may be allowed access to the application.

In some embodiments, whether a user is granted application access in a situation where the authentication server is unavailable may further depend on other factors in addition to the satisfaction of the set of allowance rate criteria. For example, in some embodiments, the user may also need to provide a set of secondary user credentials for authentication by the application. These secondary user credentials may be different from a set of primary user credentials normally utilized by the authentication server for its authentications.

Furthermore, in some embodiments, a user may only be granted limited, quarantine access rights in situations where he is authenticated while the authentication server is unavailable. This may have implications for the user's ability to access certain portions of the application or modify certain data. Moreover, in some embodiments, a user granted only quarantine access may only be able to save modified data sets in a quarantined portion of the application's database and may not be able to modify the primary version of the data sets (located in a main portion of the database) until he is fully authenticated later by the authentication server.

Referring now to the figures, shown in FIG. 1 is a diagram of an example computing environment 100 used in application access management, in accordance with embodiments of the present disclosure. In some embodiments, the computing environment 100 includes computing devices 110, 120, and 130 in communication with each other over a network 150. The network 150 may be implemented by any number of suitable remote or local communications media (e.g., wide area network (WAN), local area network (LAN), Internet, intranet, hardwire, wireless link). Further, each of the computing devices 110, 120, and 130 may be any applicable type of computer (e.g., personal computer, laptop, server, smart phone, mainframe), including, for example, the computer system 601 shown in FIG. 6. In some embodiments, the computing environment 100 may be implemented within a cloud computing environment, or using one or more cloud computing services. Consistent with various embodiments, a cloud computing environment may include a network-based, distributed data processing system that provides one or more cloud computing services. Further, the cloud computing environment may include any number of computers (e.g., hundreds or thousands of them or more), disposed within one or more data centers and configured to share resources over portions of the network 150.

The client computer 110 may be used by a human user attempting to access an application (e.g., web service) hosted on application server 120. In some embodiments, the user may be a program, operating on the client computer 110 itself, that is attempting to access and use the application on the application server 120. The authentication server 130 may be configured for authenticating (e.g., validating, confirming) the user credentials of the user acting from the client computer 110 before the user is allowed to access the application on the application server 120. The authentication server may be, for example, an LDAP server.

In some embodiments, the computing environment 100 may include any number of each of client computers 110, application servers 120, and authentication servers 130. For example, two different users on two different client computers 110 could be authenticated via a single authentication server 130 and then, based on their respective authentications, could gain access to two different applications on a single application server 120.

Furthermore, in some embodiments, the functions ascribed above to different types of computers 110, 120, and 130 could actually be performed on more or fewer types of devices. For example, a single computer could both be used directly by a user and be the host for the application being utilized (with the single computer acting, in essence, as the client computer 110 and the application server 120). For another example, a single computer could both be the host for an application being utilized and be responsible for authenticating the user's credentials (with the single computer acting, in essence, as the application server 120 and the authentication server 130). By contrast, in other embodiments, the different functionalities may purposefully be maintained on separate computing devices, so as to meet certain goals of efficiency and security. For example, applications may be hosted on different servers than authentication mechanisms so that repositories of user credentials may be used by the authentication mechanisms without being accessible to the applications. Furthermore, in some embodiments, even where an authentication mechanism and an application are hosted on the same server, the user credentials (e.g., a set of primary user credentials) may be encrypted and stored in a location that is only accessible to the authentication mechanism and is not accessible to the application (or any of its modules).

Figure 2:
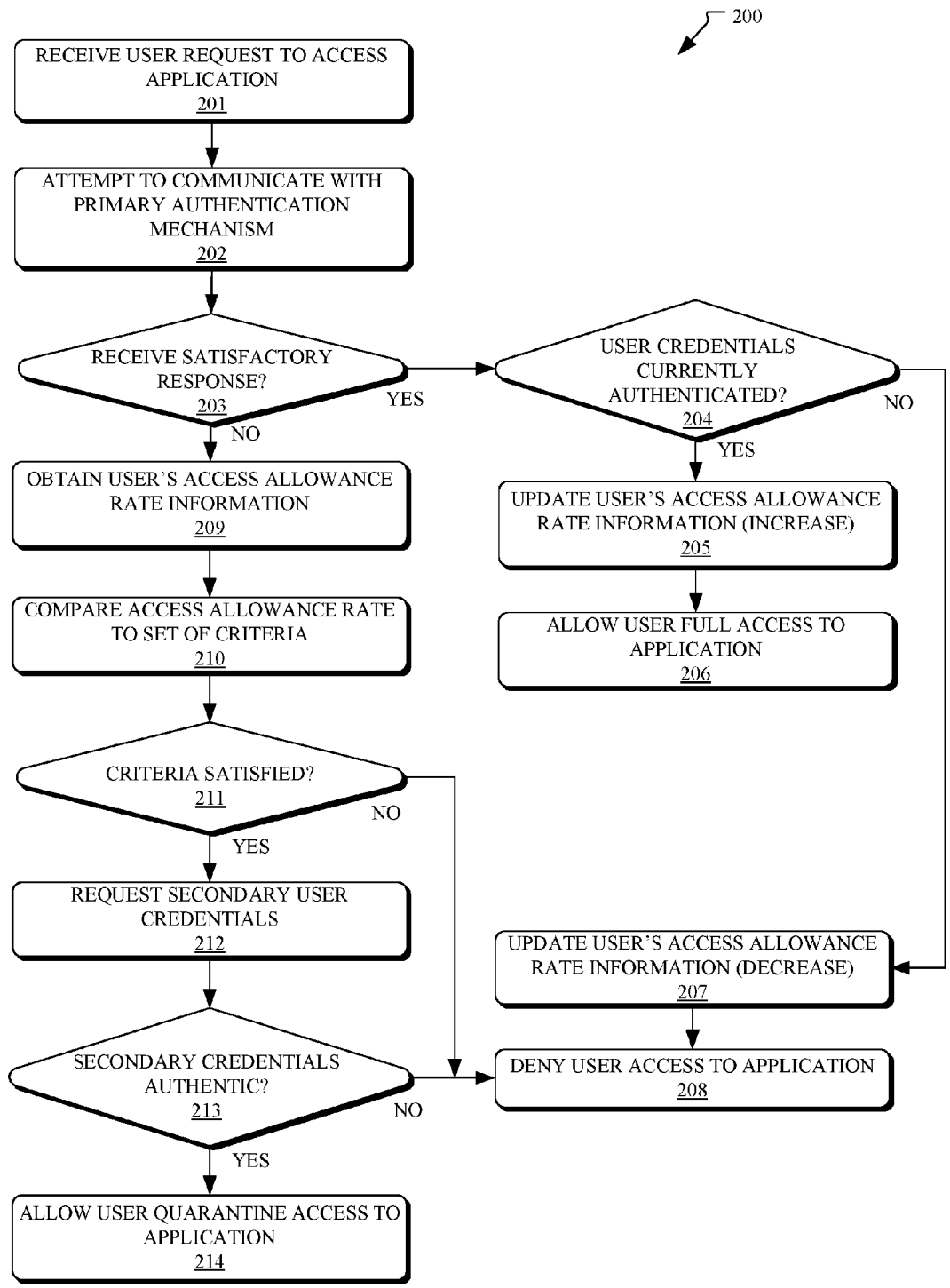
FIG. 2 illustrates a flowchart of an example method for managing user access to an application, in accordance with embodiments of the present disclosure.

Referring now to FIG. 2, shown is a flowchart of an example method 200 for managing user access to an application, in accordance with embodiments of the present disclosure. In some embodiments, the operations of method 200 may be performed by one or more of the computers 110, 120, and 130 depicted in FIG. 1. Further, in some embodiments, all of the operations of method 200 may be performed by the application server 120 depicted in FIG. 1. The method 200 may begin at operation 201, wherein a user request to access an application is received. In some embodiments, the user request may occur after the user has logged on to the application (e.g., entered the homepage of the web service), but before the user has been properly authenticated. Per operation 202, an attempt is made to communicate with a primary authentication mechanism. The purpose of the attempt is to learn, from the authentication mechanism, whether the user attempting to access the application has been authenticated. The primary authentication mechanism may be a module hosted on a server that is remote from a server that is hosting the application. To aid in the verification attempt, the communication from the application server may include a unique user identifier associated with the user attempting to gain access to the application.

Per operation 203, a determination is made as to whether a satisfactory response communication is received from the primary authentication mechanism. In some embodiments, a response from the primary authentication mechanism may only be deemed satisfactory if it includes an indication as to whether the user's credentials are currently authenticated. Examples of non-satisfactory responses could include a response indicating, without limitation, that the authentication mechanism was unable to complete an attempt to authenticate the user's credentials or that the authentication mechanism is not functioning properly. A complete lack of response (which could indicate, for example, that the application server was unable to establish a network connection with an authentication server) may also be deemed unsatisfactory.

If, per operation 203, a satisfactory response is received, then, per operation 204, a determination is made, based on the response, as to whether the user's credentials are currently authenticated (e.g., whether the user attempting to access the application has successfully proved his identity to the primary authentication mechanism). If the user's credentials have been authenticated, then, per operation 205, the user's access allowance rate information is updated (e.g., in a repository on the application server) to reflect the positive authentication, and, per operation 206, the user is allowed full access to the application.

If, however, a determination is made in operation 204 that the user's credentials have not been authenticated, then, per operation 207, the user's access allowance rate information is updated to reflect the negative assessment of the user's credentials, and, per operation 208, the user is denied access to the application.

In some situations, a satisfactory response may not be received in operation 203. If this occurs, then, per operation 209, the user's access allowance rate information may be obtained. In some embodiments, this information may be stored locally (e.g., on the application server). The information may include statistics or other records relating to completed authentication attempts for the user by the primary authentication mechanism. For example, the allowance rate information could include a table showing that the user identifier for the user has been associated with five successful and one unsuccessful completed authentications by the primary authentication mechanism in the past month. For another example, the allowance rate information could include a single value of ninety-seven that indicates that ninety-seven percent of the time in the last year this user was allowed access to the application after the primary authentication mechanism completed authentication attempts on the user's credentials (compared to only three percent denials after completed authentication attempts). Further, in some embodiments, the access allowance rate information may also include records relating to whether or not past authentication attempts were actually completed.

In some embodiments, the access allowance rate information obtained in an iteration of operation 209 may have been collected from (e.g., generated in) prior iterations of method 200 where operations 205 or 207 were performed and where the user's access allowance rate was increased or decreased, respectively.

Per operation 210, the user's access allowance rate is identified from the access allowance rate information and is compared to a set of (e.g., one or more) criteria. As used herein, a set of criteria may refer to one or more factors or requirements associated with the access allowance rate. In some embodiments, the set of criteria may include a single threshold (e.g., a minimum acceptable access allowance rate).

Per operation 211, a determination is made as to whether the set of criteria are satisfied. If they are not satisfied, then, per operation 208, the user is denied access to the application. If, however, the set of criteria are satisfied, then, per operation 212, the user is requested to provide secondary user credentials. As used herein, secondary user credentials may refer to a second set of (e.g., one or more) credentials that are different (at least in part) from the primary user credentials. In some embodiments, the secondary user credentials may be associated with lower levels of security than their counterpart credentials used by the primary authentication mechanism (e.g., primary user credentials). Examples of secondary user credentials may include, without limitation, alphanumeric passwords or security question and answer pairs.

Per operation 213, a determination is made as to whether the secondary user credentials are authentic (e.g., whether a second authentication factor provided with a user identifier properly corresponds with the user identifier). If the secondary user credentials are not authentic, then, per operation 208, the user is denied access to the application. If, however, the secondary user credentials are authentic, then, per operation 214, the user is allowed quarantine access to the application. In some embodiments, quarantine access may allow the user lesser privileges with respect to the application than full access (as provided in operation 206). Restrictions placed on quarantine access may include, for example, read-only data access, access to only limited features or functionality of the application, or access that incorporates only a limited ability to modify the settings of the application.

While an example embodiment of method 200 is described herein, many other variants on method 200 are contemplated. For example, in some embodiments, the user may be provided full access rather than only quarantine access in operation 214. Further, in some embodiments, an authentication mechanism may inform an application server every time authentication of user credentials is completed regardless of whether the user is attempting to access the application during any particular authenticated session. This may facilitate the application in maintaining accurate access allowance rate information.

Figure 3:
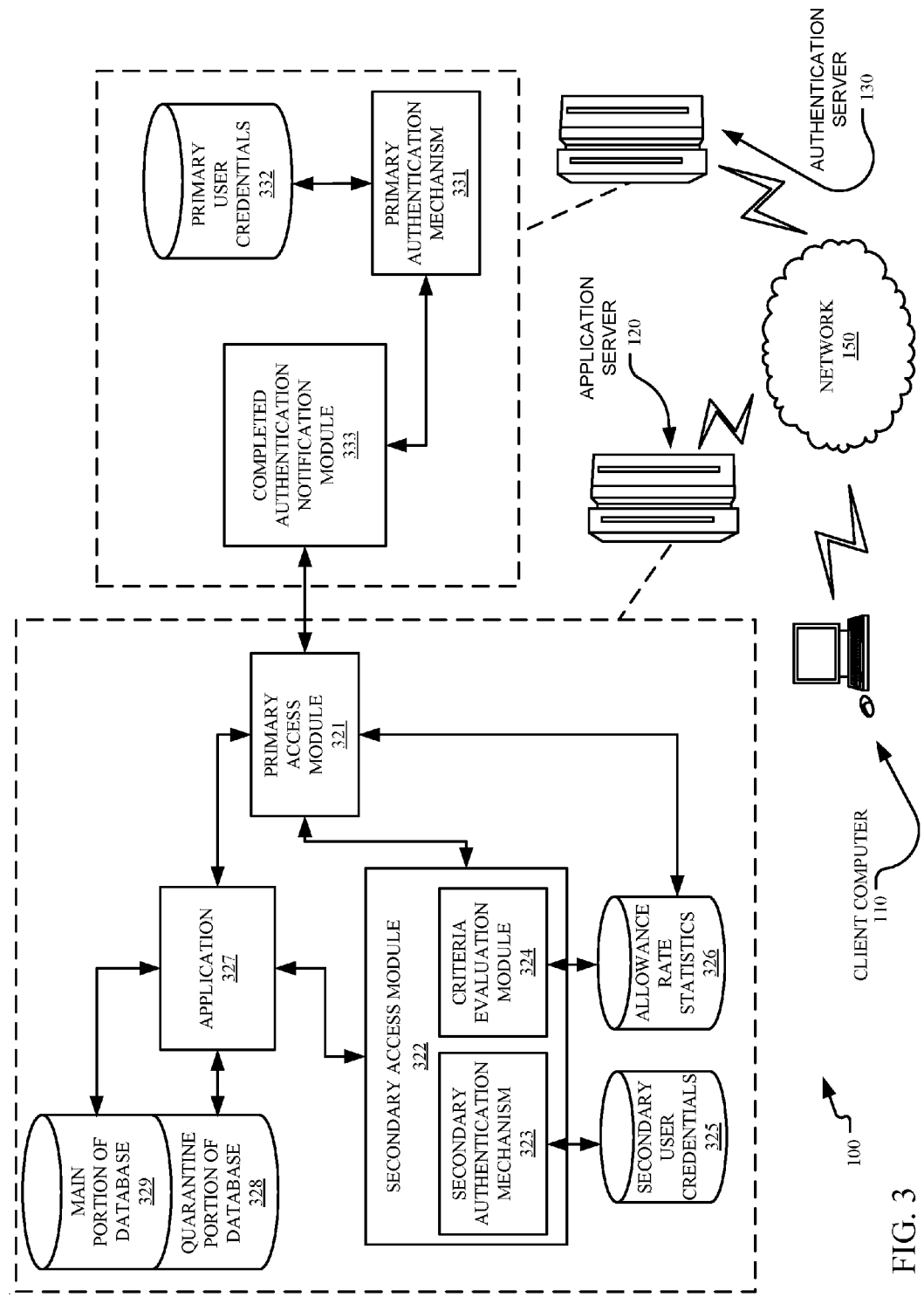
FIG. 3 illustrates a detailed block diagram of modules used within the application server and authentication server shown in FIG. 1, in accordance with embodiments of the present disclosure.

Referring now to FIG. 3, shown is a detailed block diagram of modules used within the application server 120 and authentication server 130 shown in FIG. 1, in accordance with embodiments of the present disclosure. As shown, the authentication server 130 includes a primary authentication mechanism 331, primary user credentials 332, and completed authentication notification module 333. The primary authentication mechanism 331 may be configured to receive primary user credentials for a user operating at a remote computer (e.g., client computer 110) and to complete authentication attempts on these user credentials by comparing them to the copy of the primary user credentials 332 stored in a secure location on the authentication server 130. In some embodiments, the primary user credentials may include a user identifier (e.g., a username) and at least one additional authentication factor (e.g., a password). In some embodiments, the user identifier is unique to a client computer 110 local to the user requiring authentication (e.g., the computer from which the user is acting). More specifically, the user may be authenticated based on his computer rather than on his own identity directly. This may mean that any user attempting to authenticate from that particular computer need only provide the additional authentication factor and the computer may provide the user identifier (e.g., the computer's serial number) to the primary authentication mechanism 331 automatically. In such situations, the additional authentication factor (e.g., password) may be manually entered by the user into the client computer 110.

After completing an authentication attempt, the primary authentication mechanism 331 may send the results of the completed attempt (e.g., either an indicator that the user identifier has been properly authenticated or an indicator that the user identifier has not been properly authenticated) to the completed authentication notification module 333. The completed authentication notification module 333 may be configured to notify other computers (or modules on other computers) of the results of the completed attempt. In the depicted embodiment, the completed authentication notification module 333 may only send the results to a single computer (e.g., the application server 120). In other embodiments, the completed authentication notification module 333 may transmit or broadcast a results notification to multiple computers (e.g., multiple application servers, an application server and a client computer, etc.). This may allow multiple computers to keep records of completed authentication attempts associated with one or more user identifiers.

Also shown in FIG. 3 is the application server 120. As shown, the application server 120 includes a primary access module 321, a secondary access module 322, and an application 327. Also included are secondary user credentials 325, allowance rate statistics 326, a main portion of a database 329, and a quarantine portion of the database 328. In some embodiments, the primary access module 321 may be configured to act as the primary gatekeeper to the application (or applications) located on the application server 120. The primary access module 321 may receive notifications from the completed authentication notification module 333 about users that have (or have not) been authenticated by the authentication server 130. The primary access module may store this information as part of the allowance rate statistics 326. Additionally, when receiving requests to access the application 327 from a user communicating from the client computer 110, the primary access module 321 may be configured to determine whether that user is currently acting in an authenticated session. This determination may involve comparing the user identifier for the requesting user with a list of currently authenticated users received from the completed authentication notification module 333. If the user's primary credentials have been properly authenticated, then the primary access module 321 may allow the user to access the application 327. If the primary access module 321 is unable to communicate with the authentication server 130 or otherwise determines that the primary authentication mechanism 331 is unable to complete an authentication attempt, then the primary access module 321 may be configured to pass the user's request to access the application 327 to the secondary access module 322.

As shown, the secondary access module 322 includes a criteria evaluation module 324 and a secondary authentication mechanism 323. In some embodiments, the secondary access module 322 may serve as the secondary gatekeeper to the application 327 and may be used in situations where, for one or more reasons, an attempt to complete a primary authentication fails. Upon receipt of a user request that is passed to the secondary access module 322, the criteria evaluation module 324 may be configured to analyze allowance rate statistics 326 associated with the user identifier requesting access and then compare these statistics to a set of criteria. If the results of this comparison by the criteria evaluation module 324 are unfavorable, then the user may be denied access to the application 327. However, if the results are favorable, then the user's request may be passed to the secondary authentication mechanism 323.

In some embodiments, the secondary authentication mechanism 323 may be configured for verifying the identity of users based on secondary user credentials 325, rather than primary user credentials 332. More specifically, upon receiving a communication from the criteria evaluation module 324, the secondary authentication mechanism 323 may be configured to request secondary user credentials from a user attempting to access application 327. Upon receiving these credentials, the secondary authentication mechanism 323 may be further configured to complete secondary authentication attempts on these user credentials by comparing them to the copy of the secondary user credentials 325 stored in a secure location on the application server 120. If the credentials match, then the secondary access module 322 may be configured to allow the user to have quarantine (e.g., limited) access to the application 327.

In some embodiments, the ability of a user to access features of the application 327 or portions of the application's database may change depending on the access rights granted to the user. For example, if the user is granted full access rights via the primary access module 321, then the user may be able to access and modify the main portion of the database 329, but not the quarantine portion of the database 328. For another example, if the user is granted full access rights via the primary access module 321, then user may be able to access both the main portion of the database 329 and the quarantine portion of the database 328. For yet another example, if the user is granted quarantine access rights via the secondary access module 322, then the user may be limited to accessing and modifying only the quarantine portion of the database 328. For yet another example, if the user is granted quarantine access rights via the secondary access module 322, then the user may be limited to modifying only the quarantine portion of the database 328, but may still have read-only access rights to the main portion of the database 329.

Furthermore, in some embodiments, a quarantine portion of a database 328 may actually be a subset of a main portion of the database 329. This may occur, for example, when a quarantined user is not given access to materials that are particularly sensitive but is given access to the other materials within a database.

To aid understanding, an example scenario wherein the modules described in reference to FIG. 3 are utilized is described herein. In this example scenario, John Smith, the CEO of SmithCorp, uses his laptop (client computer 110) for his work over a series of weeks. In a first week, Smith connects to SmithCorp's authentication server (authentication server 130) from his laptop and, when prompted, enters his primary user credentials, including his user identifier, "JSmith", and his password, "abc123". His credentials are authenticated (by the primary authentication mechanism 331) and his computer is then logged in to an authenticated session. Smith then attempts to access banking software (application 327) from his laptop. The application server (application server 120) confirms that Smith is currently in an authenticated session (e.g., by communicating with the completed authentication notification module 333). Smith is able to have full access to the banking software and completes his work for the day.

In the second week, Smith is working from his home and is unable to access SmithCorp's authentication server from his laptop. He again tries to access the banking software. The application server is unable to confirm that Smith has been authenticated by the authentication server. In response, the application server checks the access allowance rate for the authentication server. Specifically, the application server checks whether the access allowance rate statistics 326 associated with Smith's user identifier, "JSmith", have been above ninety percent over the past month. Finding the applicable rate to be ninety-five percent, the application server (via secondary authentication mechanism 323) prompts Smith to provide his mother's maiden name and his place of birth (secondary user credentials 325). Smith enters these credentials correctly and is provided quarantined access to the banking software. As part of the quarantined access, Smith has the ability to view some of the information about SmithCorp's accounts, but is not able to make significant financial transactions using the software.

Continuing the scenario into a third week, a news article about the financial success of Smith and SmithCorp is published. In the hopes of gaining insight into his success, several different individuals try to log in to SmithCorp's authentication server using Smith's user identifier. Because they do not know Smith's password, none of the individuals is successfully authenticated. Each time a completed authentication attempt by one of these individuals fails, the authentication server informs the application server (via the completed authentication notification module 333), and the application server records the reduction in the allowance rate (in the allowance rate statistics 326) associated with the JSmith user identifier.

Late in the third week, a thief steals Smith's laptop. Using the stolen laptop, the thief attempts to use the JSmith user identifier to access SmithCorp's banking software directly through the application server without first communicating with SmithCorp's authentication server. Upon determining that authentication server is not able to complete an authentication attempt (because the thief bypassed communicating with the authentication server altogether), the application server then checks the access allowance rate associated with the JSmith user identifier. Finding the allowance rate to have dropped below the ninety-percent success rate threshold (due to the multiple failed authentication attempts in the third week), the application server denies the thief access to the banking software.

Figure 4:
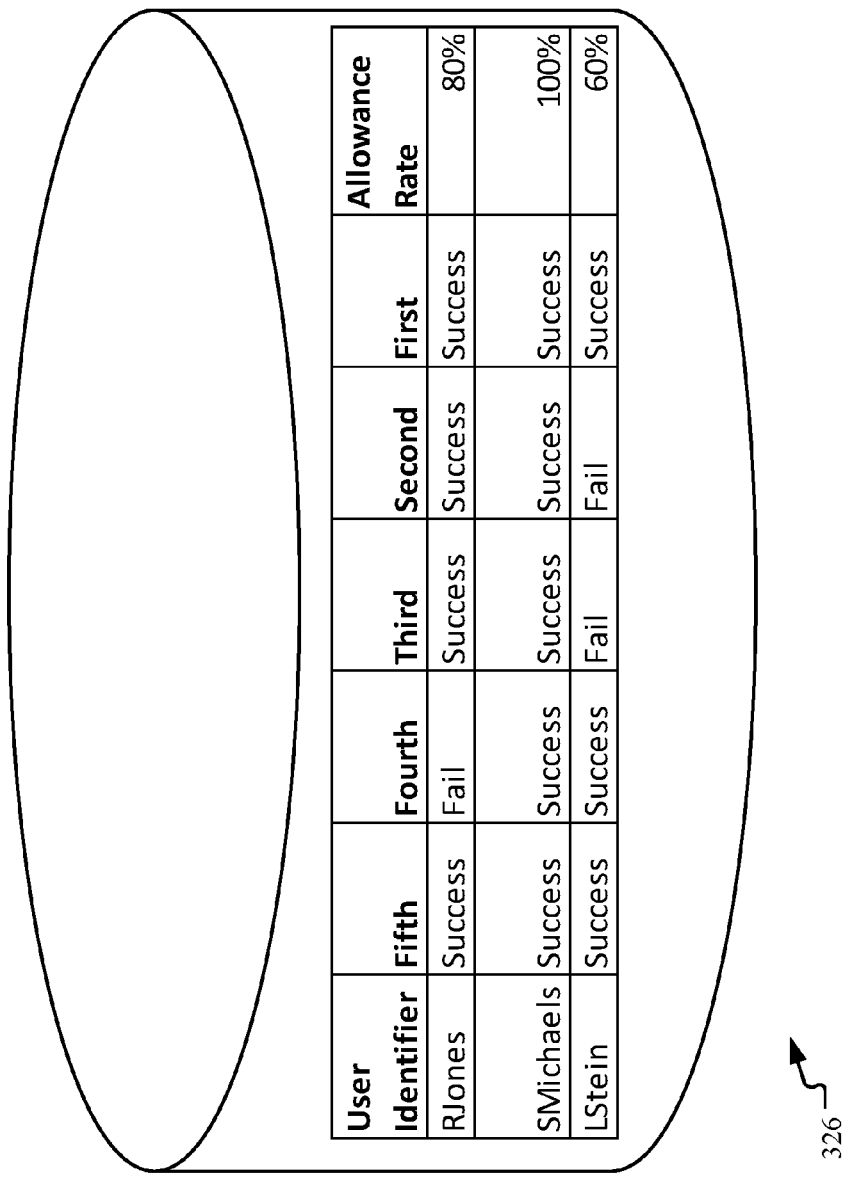
FIG. 4 illustrates a table representing the access allowance rate statistics described in FIG. 3, in accordance with embodiments of the present disclosure.

Referring now to FIG. 4, shown is a table representing the access allowance rate statistics 326 of FIG. 3, in accordance with embodiments of the present disclosure. As depicted, the table includes a plurality of user identifiers (RJones, SMichaels, and LStein). Associated with each user credential are the five most-recent completed authentication attempts by the primary authentication mechanism for that particular user credential. For example, the last row of the table shows that LStein is associated with three successful authentications and two failed authentications out of the last five completed attempts. The last column of the table includes the calculated access allowance rate (e.g., the success rate among completed authentication attempts) for each user identifier over the five most-recent attempts associated with each user identifier. In some embodiments, the table may be updated each time a new authentication attempt is completed for a particular user identifier.

Figure 5:
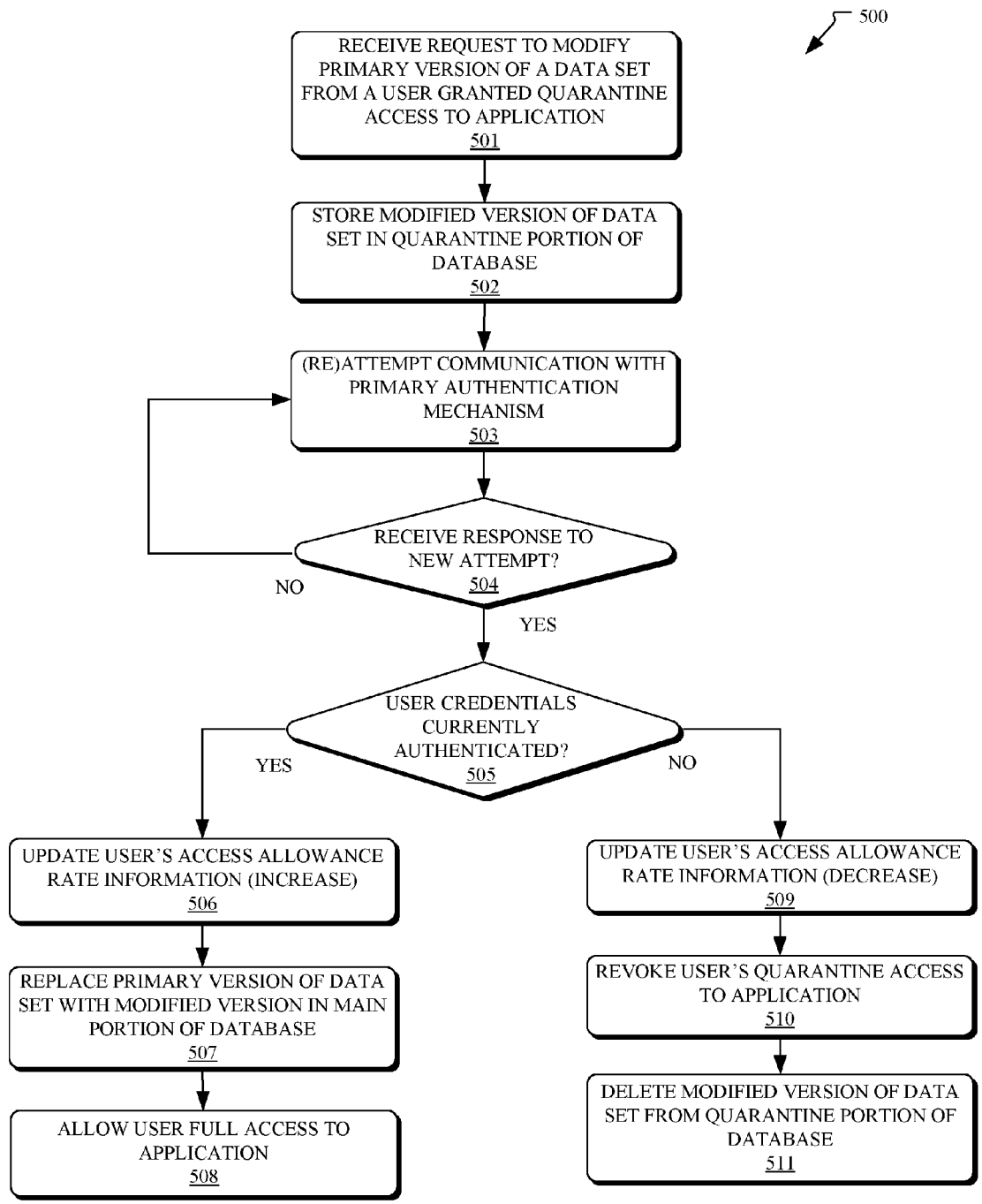
FIG. 5 illustrates a flowchart of an example method for managing data modification attempts by users granted quarantine access to an application, in accordance with embodiments of the present disclosure.

Referring now to FIG. 5, shown is a flowchart of an example method 500 for managing data modification attempts by users granted quarantine access to an application, in accordance with embodiments of the present disclosure. In some embodiments, the operations of method 500 may be performed subsequent to the user being both logged into an application and allowed, pursuant to operation 214 of FIG. 2, quarantine access to the application. Furthermore, in some embodiments, some of the operations of the method 500 may be performed by one or more of the computers 110, 120, and 130 depicted in FIG. 1. Further, in some embodiments, all of the operations of method 500 may be performed by the application server 120 depicted in FIG. 1.

In some embodiments, the method 500 may begin at operation 501, wherein a request to modify a primary version of a data set is received from a user granted quarantine access to an application. The data set may include any applicable information associated with the application (e.g., stored data records, user settings). The primary version of the data set may be stored in a main portion of an application database (e.g., main portion 329 of FIG. 3). Per operation 502, and because the user has only limited access rights, a modified version of the data set may be created and stored in a quarantine portion of the application database (e.g., quarantine portion 328 of FIG. 3). This may help to preserve the integrity of the primary version of the data set in the event the user turns out later to have been improperly using the application.

Per operation 503, an attempt (or reattempt) is made to communicate with the primary authentication mechanism in an effort to determine whether the quarantined user has been authenticated by the primary authentication mechanism. Per operation 504, a determination is made as to whether a satisfactory response to the communication has been received. If a satisfactory response has not been received, then operation 503 is repeated, with new attempts to communicate being made. In some embodiments, operation 503 may be repeated periodically or regularly. Further, in some embodiments, operation 503 may be repeated each time the quarantined user requests a new modification to a data set.

If, per operation 504, a satisfactory response has been received, then, per operation 505, another determination is made as to whether the response indicates that the applicable primary user credentials are currently authenticated or not. If the received response indicates that the primary user credentials are currently authenticated, then the user's access allowance rate information is increased, per operation 506, to reflect the current authentication. Per operation 507, the primary version of the data set is replaced, in the main portion of the application database, with the modified version of the data set. And, per operation 508, the user is upgraded to full access to the application.

If, however, the received response indicates, per operation 505, that the quarantined user failed the most recent authentication attempt (and is therefore not currently authenticated), then the user's access allowance rate is decreased, per operation 509. Per operation 510, the user's quarantine access to the application is revoked. And, per operation 511, the modified version of the data set is deleted from the quarantine portion of the application database.

In some embodiments, the ability to have quarantine access may be particularly useful for a user that is acting from a remote, mobile work location. The user may be able to remotely access live, production data artifacts but be able to modify, add, or delete artifacts only in a quarantined area within the application. Then, when the user is logged back in from a local workstation (one where he can be authenticated by the authentication server), he may be able to commit the changes from the quarantined area to the main area of the application database, or, in some embodiments, the authentication by the authentication server may result in the changes being automatically committed. At the same time, the user may need to resolve conflicts with data sets that are not able to be automatically committed because there are different versions of the data set that conflict with each other. This may occur, for example, where two users are independently modifying the same data set at the same time. Furthermore, in some embodiments, secondary users with high levels of authority (e.g., managers) may have the ability to login to an application and commit or delete modified data sets stored in a quarantined area by other users that the secondary user oversees.

Figure 6:
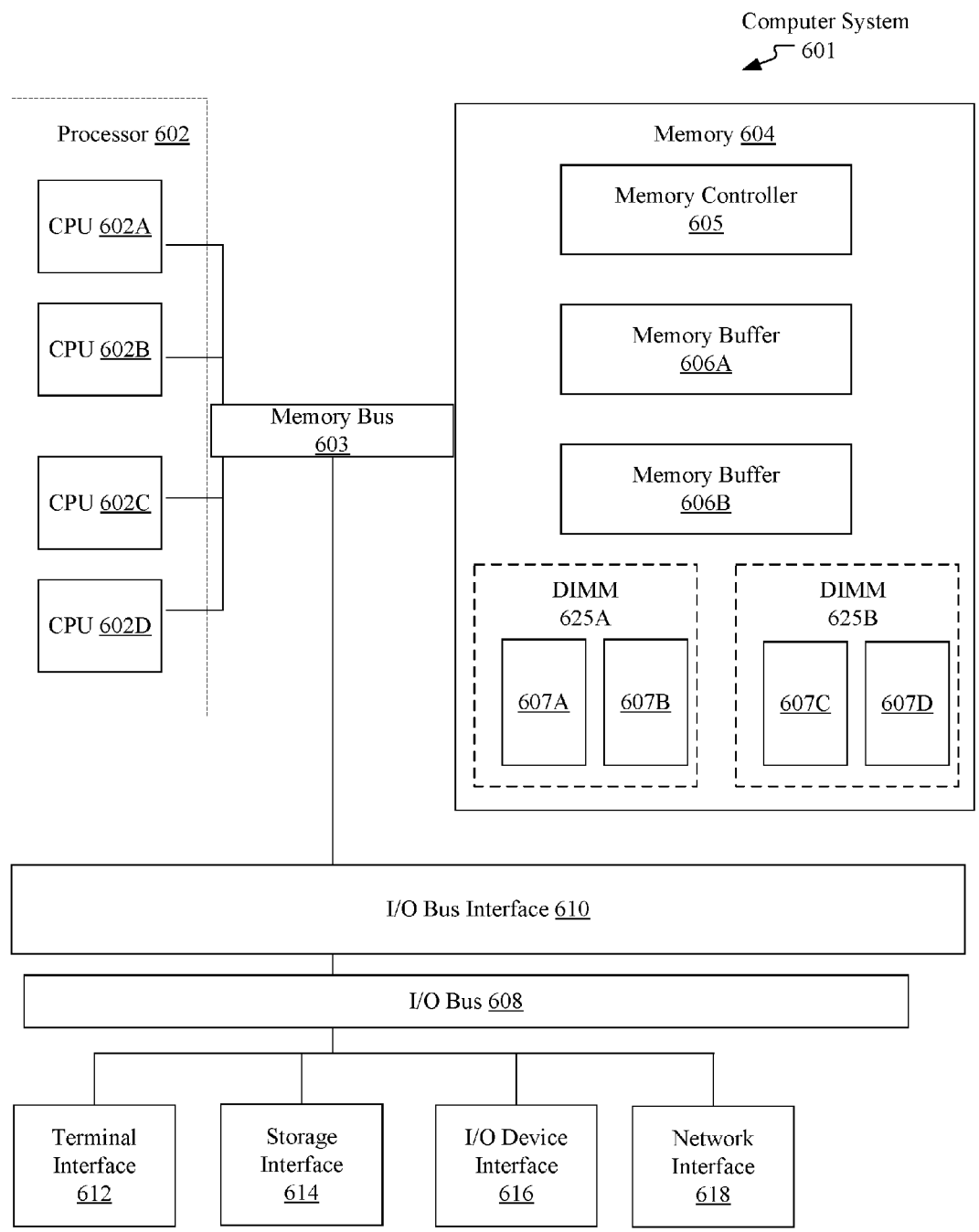
FIG. 6 illustrates a high-level block diagram of an example computer system that may be used in implementing one or more of the methods described herein, in accordance with embodiments of the present disclosure.

Referring now to FIG. 6, shown is a high-level block diagram of an example computer system (i.e., computer) 601 that may be used in implementing one or more of the methods, tools, mechanisms, and modules, and any related functions or operations, described herein (e.g., using one or more processor circuits or computer processors of the computer), in accordance with embodiments of the present disclosure.

In some embodiments, computer system 601 may be a client, a server, or any other computing device described herein. In some embodiments, the major components of the computer system 601 may comprise one or more CPUs 602, a memory subsystem 604, a terminal interface 612, a storage interface 614, an I/O (Input/Output) device interface 616, and a network interface 618, all of which may be communicatively coupled, directly or indirectly, for inter-component communication via a memory bus 603, an I/O bus 608, and an I/O bus interface unit 610.

The computer system 601 may contain one or more general-purpose programmable central processing units (CPUs) 602A, 602B, 602C, and 602D, herein generically referred to as the CPU 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may comprise one or more levels of on-board cache.

In some embodiments, the memory subsystem 604 may comprise a random-access semiconductor memory, storage device, or storage medium (either volatile or non-volatile) for storing data and programs. In some embodiments, the memory subsystem 604 may represent the entire virtual memory of the computer system 601, and may also include the virtual memory of other computer systems coupled to the computer system 601 or connected via a network. The memory subsystem 604 may be conceptually a single monolithic entity, but, in some embodiments, the memory subsystem 604 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

In some embodiments, the main memory or memory subsystem 604 may contain elements for control and flow of memory used by the CPU 602. This may include all or a portion of the following: a memory controller 605, one or more memory buffers 606A and 606B and one or more memory devices 625A and 625B. In some embodiments, the memory devices 625A and 625B may be dual in-line memory modules (DIMMs), which are a series of dynamic random-access memory (DRAM) chips 607A-607D (collectively referred to as 607) mounted on a printed circuit board and designed for use in personal computers, workstations, and servers. The use of DRAMs 607 in the illustration is exemplary only and the memory array used may vary in type as previously mentioned.

Although the memory bus 603 is shown in FIG. 6 as a single bus structure providing a direct communication path among the CPUs 602, the memory subsystem 604, and the I/O bus interface 610, the memory bus 603 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 may, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface, but receives requests from other computer systems (clients). Further, in some embodiments, the computer system 601 may be implemented as a desktop computer, portable computer, laptop or notebook computer, tablet computer, pocket computer, telephone, smart phone, or any other appropriate type of electronic device.

It is noted that FIG. 6 is intended to depict the representative major components of an exemplary computer system 601. In some embodiments, however, individual components may have greater or lesser complexity than as represented in FIG. 6, components other than or in addition to those shown in FIG. 6 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising a processor of an application server and a memory having program instructions embodied thereon, the program instructions configured to, when executed by the processor, cause the processor to perform a method comprising:

receiving, by an application server and as part of a user attempting to access an application hosted on the application server, primary user credentials from a client computer at which the user is located, wherein the client computer is remote from the application server, and wherein the primary user credentials include a user identifier and a first alphanumeric password;

attempting, by the application server and in response to the receiving the primary user credentials, to authenticate the primary user credentials via a primary authentication mechanism hosted on an authentication server, wherein the authentication server is remote from both the client computer and the application server;

failing, by the application server, to complete the attempt to authenticate the primary user credentials via the primary authentication mechanism due to the application server being unable to establish a network connection with the authentication server;

identifying, by the application server, an access allowance rate for the primary authentication mechanism, the access allowance rate based on a plurality of prior completed authentication attempts associated with the user identifier, wherein the access allowance rate is stored locally on the application server;

comparing, by the application server and in response to the failure to complete the authentication attempt via the primary authentication mechanism, the access allowance rate to a set of criteria;

determining, by the application server and based on the comparing, that the access allowance rate satisfies the set of criteria;

prompting, by the application server and in response to the determining that the access allowance rate satisfies the set of criteria, the user to provide a second alphanumeric password via the client computer;

receiving, by the application server and in response to the prompting, the second alphanumeric password;

authenticating, by a secondary authentication mechanism hosted on the application server, the second alphanumeric password;

allowing, in response to the authentication via the secondary authentication mechanism, the user access to the application, wherein the inability to complete the authentication attempt via the primary authentication mechanism causes the allowed access to be read-only access for a main portion of a database stored on the application server, the main portion of the database including a primary version of a data set;

receiving, by the application server and after the allowing the user access to the application, a user request to modify the data set;

storing, in response to the user request, a modified version of the data set in a quarantine portion of the database;

establishing, by the application server and after the storing the modified version of the data set, the network connection with the authentication server;

determining, by the application server and in response to the establishing the network connection, whether the primary user credentials are currently authenticated by the primary authentication mechanism;

in response to determining that the primary user credentials are currently authenticated by the primary authentication mechanism, replacing, by the application server, the primary version of the data set in the main portion of the database with the modified version of the data set and expanding, by the application server, the allowed access for the main portion of the database from read-only access to full access; and in response to determining that the primary user credentials are not currently authenticated by the primary authentication mechanism, deleting, by the application server, the modified version of the data set in the quarantine portion of the database and revoking, by the application server, the allowed access.

* * * * *